US006297831B1

(12) United States Patent
Swan

(10) Patent No.: US 6,297,831 B1
(45) Date of Patent: Oct. 2, 2001

(54) IMAGE GENERATOR USING DISPLAY MEMORY

(75) Inventor: Philip L. Swan, Richmond Hill (CA)

(73) Assignee: ATI Technologies, Inc., Thornhill (CA)

( * ) Notice: Subject to any disclaimer, the term of this patent is extended or adjusted under 35 U.S.C. 154(b) by 0 days.

(21) Appl. No.: 09/712,339

(22) Filed: Nov. 13, 2000

Related U.S. Application Data

(62) Division of application No. 08/795,538, filed on Feb. 6, 1997, now Pat. No. 6,181,354.

(51) Int. Cl.[7] ........................ G06F 15/00
(52) U.S. Cl. ........................ 345/517
(58) Field of Search ........................ 345/507, 525, 345/434, 430, 118, 202, 517, 516, 433

(56) References Cited

U.S. PATENT DOCUMENTS 4,670,841 * 6/1987 Kostopoulos ........................ 345/439
5,414,524 * 5/1995 Payson et al. ........................ 345/434
5,838,334 * 11/1998 Dye ........................ 345/339
6,181,354 * 1/2001 Swan ........................ 345/517

* cited by examiner

*Primary Examiner*—Phu K. Nguyen

(57) ABSTRACT

A graphics system is used with a display capable of displaying a frame of an image via a sequence of scan lines. The graphics system has a memory and an image generator. The image generator is connected to store the data associated with some of the scan lines of the frame in a region of the memory, and before all of the data is retrieved from the region, store other data associated with another scan line in the region. The graphics system also has a display interface that is connected to retrieve the data associated with some of the scan lines from the region and use the data to form some of the scan lines on the display. The display interface is also connected to use the other data to form the next scan line in the sequence after the other scan lines are formed.

20 Claims, 9 Drawing Sheets

IMAGE GENERATOR USING DISPLAY MEMORY

This application is a divisional of patent application Ser. No. 08/795,538 filed Feb. 6, 1997 now U.S. Pat. No. 6,181,354.

BACKGROUND OF THE INVENTION

The invention relates to image generation.

As shown in FIG. 1, for purposes of simulating the motion of objects 8 in a three-dimensional (3-D) image 6, a typical graphics system generates and displays successive frames (i.e., snapshots) of the image 6. The graphics system may update the position, orientation, and viewpoint of all the objects 8 for each frame.

However, to reduce the required memory bandwidth and memory capacity, the graphics system may take advantage of the fact that some objects 8*a* (e.g., background objects farther from the viewer) do not require updates as frequently as other objects 8*b* (e.g., foreground objects closer to the viewer). As shown in FIG. 2, a graphics system 10 recognizes this advantage by dividing the image 6 into image layers (typically parallel with the X-Y plane) with each image layer containing one or more objects 8. The graphics system 10 selectively updates the image layers (i.e., the objects in the image layers) according to a rate at which the image layer changes which allows some objects (e.g., foreground objects) to be updated more frequently than other objects (e.g., background objects).

The physical properties (e.g., size and appearance) of each object 8 are typically defined by a data structure 12 (e.g., a "sprite") stored in a memory 15. To perform affine transformations (e.g., rotation and translation) of the objects 8 of a selected image layer, the graphics system 10 has a polygon object processor 14. An image layer compositor 16 combines the image layers (whether updated or not) to form image data which a video output circuit 22 uses to form horizontal scan lines (and thus, the image 6) on a display 26 (FIG. 3).

To form a frame of an image, the video output circuit 22 generates the horizontal scan lines in a predetermined sequence. Each scan line is generated in a left to right fashion across the display 26, and to generate one frame (assuming no interlacing) the sequence begins at the top (i.e., for the first scan line) and ends at the bottom (i.e., for the last scan line) of the display 26.

The compositor 16 forms the image data in a piecewise fashion by subdividing the image 6 along an X-Y plane into horizontal bands 24 (i.e., blocks of scan lines) extending across the screen 26. The compositor 16 forms the image data for each band 24 inside a compositing buffer 18. To minimize delays between the forming of the image data of the band 24 and the retrieving of image data by the video output circuit 22, the compositing buffer 18 has two band buffers 20 used alternatively by the video output circuit 22 and the image layer compositor 16. The image layer compositor 16 forms image data for one of the bands 24 in one band buffer 20 while the video output circuit 22 simultaneously retrieves the image data for another one of the bands 24 from the other buffer 20.

SUMMARY OF THE INVENTION

The invention provides a graphics system that allows a region of memory to be updated with data while the same region of memory is being used to generate scan lines. In this manner, the graphics system stores image data for a first set of scan lines (e.g., a horizontal band of scan lines) in the region of memory. Data for a second set of scan lines which sequentially follow the first set of scan lines (e.g., an adjacent horizontal band of scan lines) may be stored in the same region of memory before all of the image data for the first set of scan lines is retrieved. As a result, an entire frame of the image may be generated using a region of memory no larger than that required to store the image data for a few scan lines (e.g., one horizontal band of scan lines).

In general, in one aspect, the invention features a method for use with a display capable of displaying a frame of an image via a sequence of scan lines. The method includes storing data associated with one or more scan lines of the frame in a region of a memory. The data is retrieved from the region, and one or more scan lines are formed on the display using the data. Before all of the data is retrieved from the region, other data associated with the next scan line in the sequence is stored in the region of the memory. This other data is used to form the next scan line in the sequence after the other scan lines are formed.

In preferred embodiments, the data has at least one data patch associated with a portion of the image, and the portion of the image has a maximum scan oriented dimension less than the predetermined scan dimension. The data patches are substantially the same size. Each data patch includes multiple subsets of data, and each is the multiple subsets of data is associated with one of the scan lines. The subsets of data are associated with exactly one scan line. The image has horizontal bands, and the data patches form one of the horizontal bands. Some of another data patch is stored in the memory outside of the first region. The scan lines are substantially horizontal. Storing the data in the memory includes compressing the data to form compressed data and transferring the compressed data to the memory. The region has rows and columns, and storing the data in the memory includes alternating the storage of the data associated with some of the scan lines and the other data between the rows and columns of the region.

In general, in one aspect, the invention features a method for use with a graphics system capable of furnishing data representative of an image and having a display capable of displaying the image via scan lines. Each of the scan lines has a predetermined scan dimension. The method includes forming a data patch associated with a portion of the image. The portion of the image has a maximum scan oriented dimension less than the predetermined scan dimension. The data patch is used to generate at least one of the scan lines on the display.

In preferred embodiments, the image has horizontal bands of scan lines. Each horizontal band has a scan oriented dimension close to the predetermined scan dimension. The data patch is stored in a memory that is used to store data associated with one of the horizontal bands, and more than one data patch is stored in the memory to form the data associated with one of the horizontal bands. The data furnished by the graphics system includes image layers of the image, and portions of the image layers are combined to form the data patch. The portion of the image is substantially rectangular. Other data patches stored in the memory are used to form one scan line on the display.

In general, in another aspect, the invention features a graphics system for use with another system capable of furnishing data representative of an image and having a display capable of displaying the image via scan lines. Each of the scan lines has a predetermined scan dimension. The graphics system has a patch generator connected to form a data patch associated with a portion of the image. The portion of the image has a maximum scan oriented dimension less than the predetermined scan dimension. The graphics system also has a display interface connected to use the data patch to generate at least one of the scan lines on the display.

In general, in another aspect the invention features a graphics system for use with a display capable of S displaying a frame of an image via a sequence of scan lines. The graphics system has a memory and an image generator. The image generator is connected to store the data associated with some of the scan lines of the frame in a region of the memory, and before all of the data is retrieved from the region, store other data associated with another scan line in the region. The graphics system also has a display interface that is connected to retrieve the data associated with some of the scan lines from the region and use the data to form some of the scan lines on the display. The display interface is also connected to use the other data to form the next scan line in the sequence after the other scan lines are formed.

Other advantages and features will become apparent from the following description and from the claims.

DESCRIPTION OF THE PREFERRED EMBODIMENTS

Figure 1:
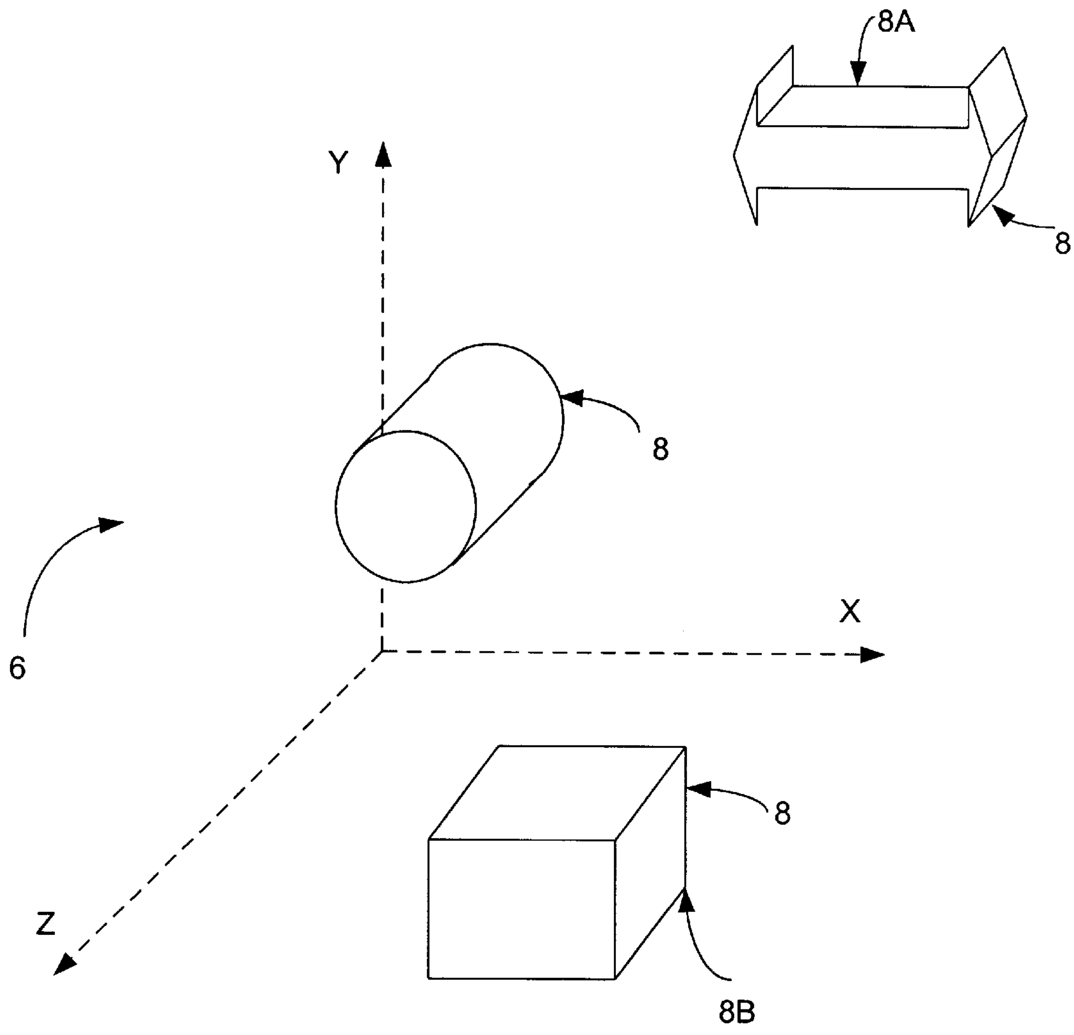
FIGURE 1 (PRIOR ART)
FIG. 1 is an illustration of a three-dimensional image.
Figure 2:
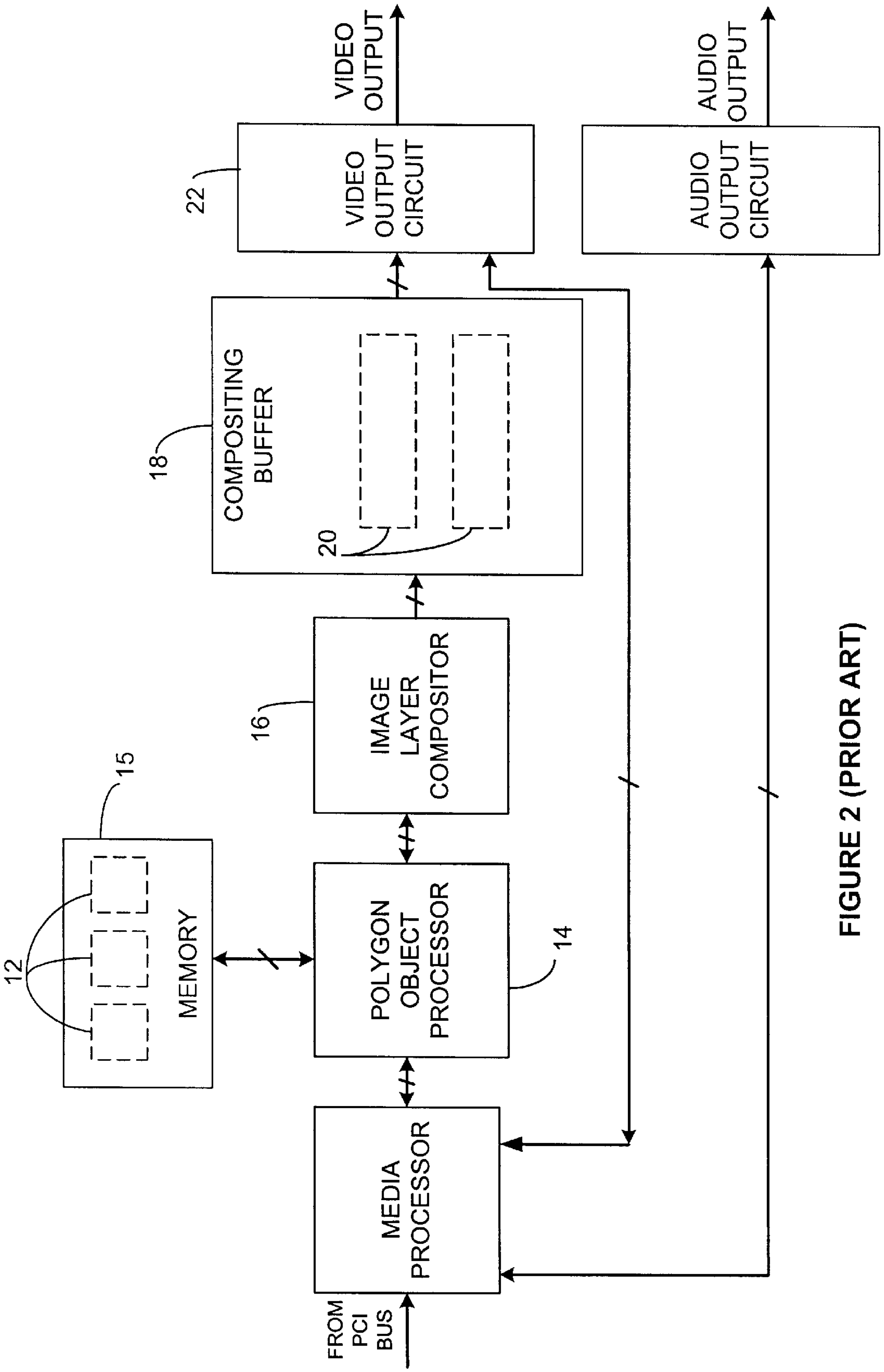
FIGURE 2 (PRIOR ART)
FIG. 2 is a block diagram of a graphics system of the prior art.
Figure 3:
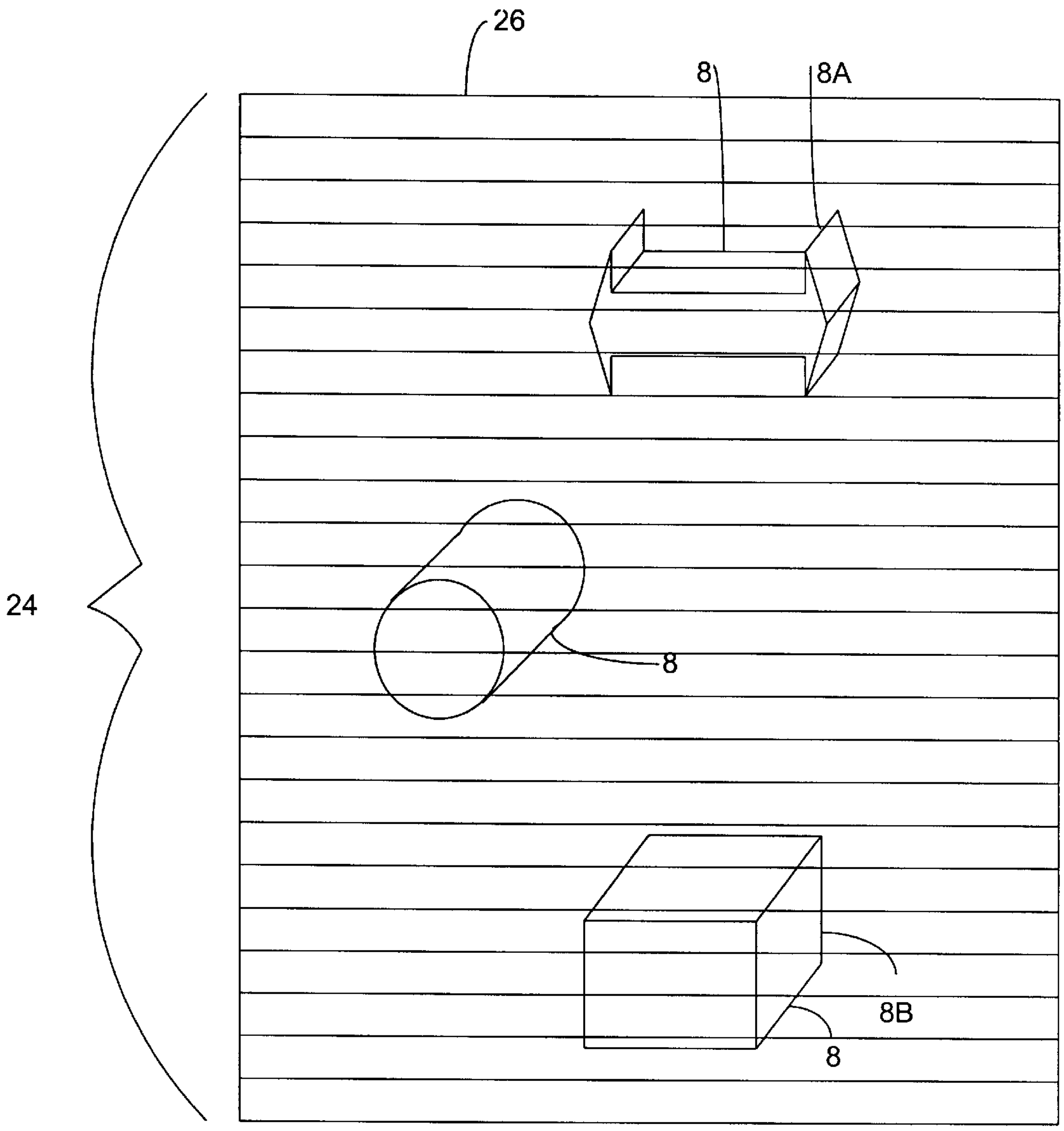
FIGURE 3 (PRIOR ART)
FIG. 3 is a view of the image of FIG. 1 on a display.
Figure 4:
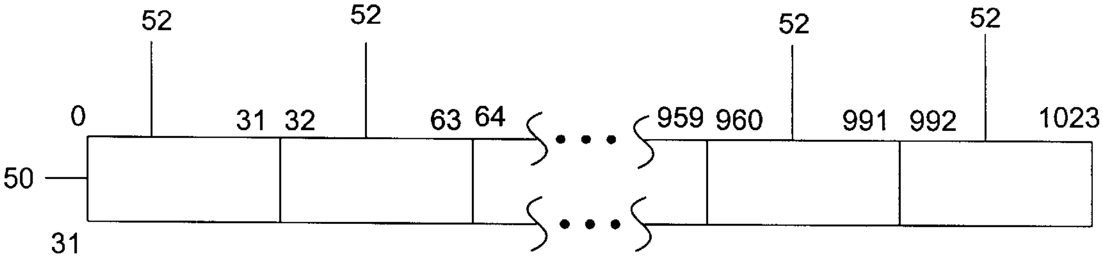
FIG. 4 is view of a horizontal band of the display.
Figure 5:
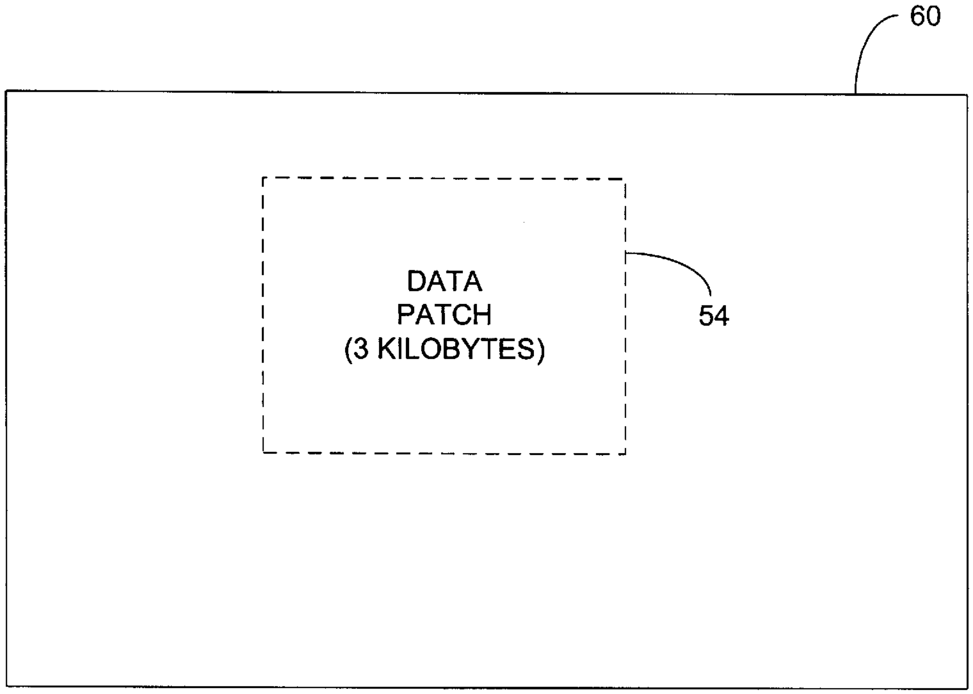
FIG. 5 is a view of graphics data representing a portion of the horizontal band.

Referring to FIGS. 4 and 5, a frame of an image is subdivided into rectangular pixel units 52 for processing. Each pixel unit 52 has a height of thirty-two pixels and a width of thirty-two pixels (i.e., the width is less than the scan-oriented dimension (1024 pixels) of the display), and thirty-two pixels units 52 form a horizontal band 50 of thirty-two scan lines. The processing of each pixel unit 52 produces an associated data patch 54 of three byte pixel color values (representative of the colors of the pixels in the pixel unit 52) which is stored in a display memory 60 along with thirty-one other data patches 54 to form the pixel color values for one horizontal band 50. The pixel color values are retrieved from the memory 60 (one scan line at a time) to form the scan lines on a display. Using a mapping scheme discussed below, the memory 60 may be updated with an additional data patch 54 as each scan line of data is retrieved from the memory 60. Thus, the memory 60 is only required to store data (e.g., 96 kilobytes for three byte pixel color values) for one horizontal band 50, and double buffering of the pixel color values for each horizontal band 50 is not required.

Figure 6:
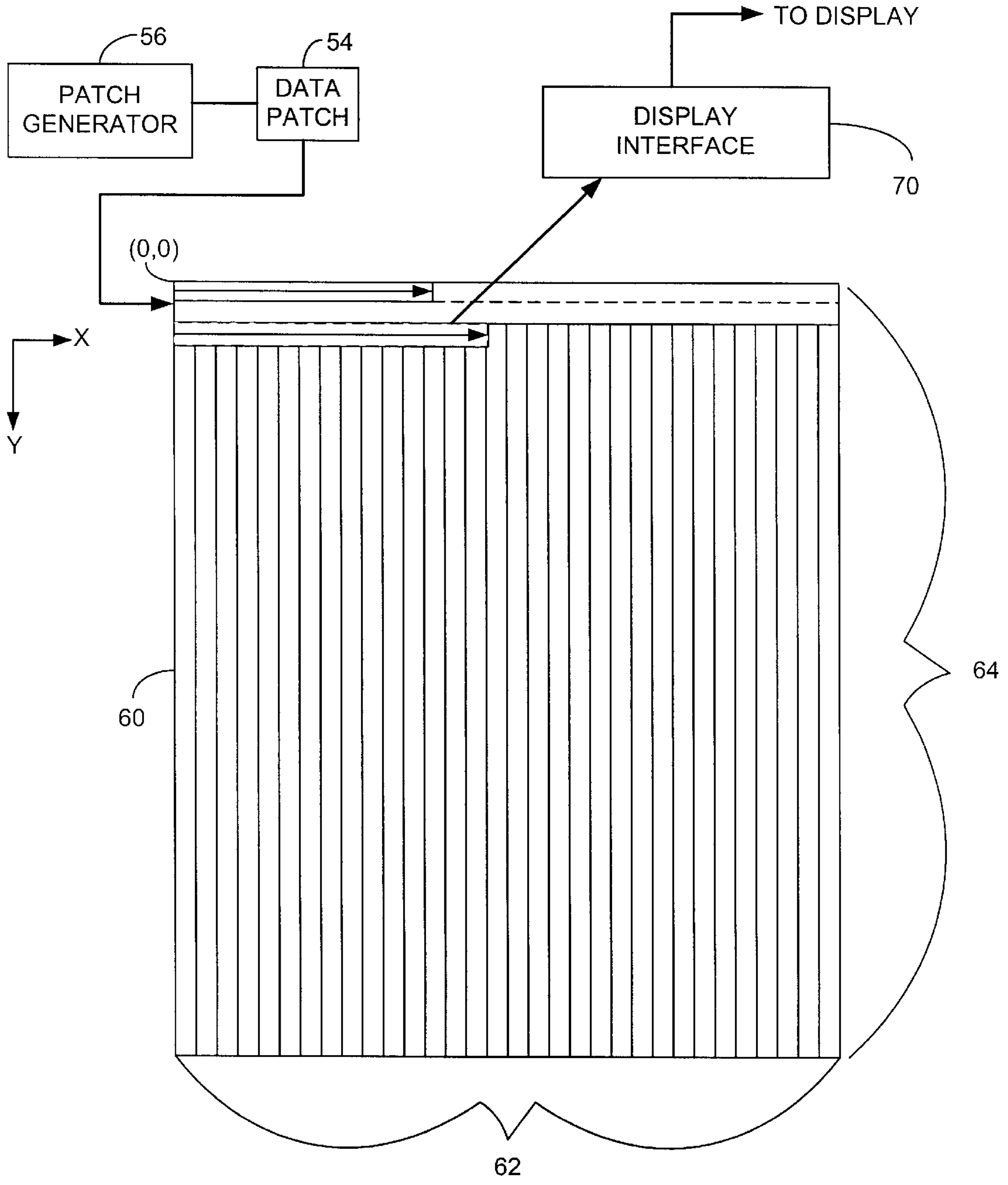
FIG. 6 is a schematic view illustrating the processing of the graphics data.

As shown in FIG. 6, to accomplish this, a mapping scheme is used that addresses a set of predefined locations in the memory 60 using a 32×32, two-dimensional array. Columns 62 (thirty-two total) of the array have a predefined element size of ninety-six bytes (for a total of three kilobytes per column), and each of rows 64 (thirty-two total) of the array has a size of three kilobytes (i.e., thirty-two columns).

Thus, a row of the array may store either the pixel color values (i.e., 3 kilobytes) for one of the scan lines or the color values for one of the data patches 54. Similarly, a column of the array may store either the pixel color values for one of the scan lines or the pixel color values for one of the data patches 54. In recognition of this, for each horizontal band 50 stored in the memory 60, a patch generator 56 (storing one of the data patches 54 in the memory 60) and a display interface (retrieving the pixel color values for one of the scan lines) alternate use of the rows 64 and columns 62 of the memory 60.

As an example of the mapping scheme, to store one of the horizontal bands 50 in the memory 60, the patch generator 56 uses the columns of the array. The patch generator 56 starts with column zero (for data patch 54 number one) and stores data patches 54 zero through thirty-one of the band 50 in rows zero through thirty-one (i.e., elements (0,0) through (0,31)), respectively, of the array. Once the horizontal band 50 is stored in the memory 60, row zero of the array contains the top scan line of the horizontal band 50. Accordingly, the display interface 70 retrieves the scan lines of the horizontal band 50 (in one scan line at a time) from the rows (i.e., elements (0,0) through (31,0)) of the array (beginning with row zero). After the display interface 70 retrieves the scan line from row zero, the patch generator 56 begins storing new data patches 54 (for the next horizontal band 50) in the rows (beginning with row zero) as the rows become available (i.e., as the display interface 70 reads the scan lines from the rows).

As a result of this mapping scheme, adjacent horizontal bands 50 are stored orthogonally to each other in the memory 60, as the patch generator 56 stores data patches 54 for even horizontal bands 50 in the columns of the array and stores data patches 54 for odd horizontal bands 50 in the rows of the array. Likewise, the display interface 70 retrieves the scan lines for even horizontal bands 50 from the rows of the array and retrieves the scan lines for odd horizontal bands 50 from the columns of the array.

In the above-described array, each row and column has the capacity to store the pixel color values for either one scan line or one data patch 54. However, the size of the array and the element size will not be changed as long as the following conditions are satisfied. First, all of the elements storing one of the scan lines should become available once the display interface 70 retrieves the pixel color values for the scan line. Second, all of the bytes of the elements storing one the data patches 54 should be used. Third, the elements should be freed at a rate that causes the rows (or columns) to become available in time to receive a new data patch 54.

Some patches processed by the patch generator 56 consume more processing time than others. To maximize the availability of scan lines in the memory 60 for the display interface 70, a larger memory 60 may be used to allow the patch generator 56 to get ahead of schedule. As described below, when using compression techniques to reduce the size of the data patches 54, a larger memory 60 may also be used to accommodate data patches 54 that do not compress well.

Figure 7:
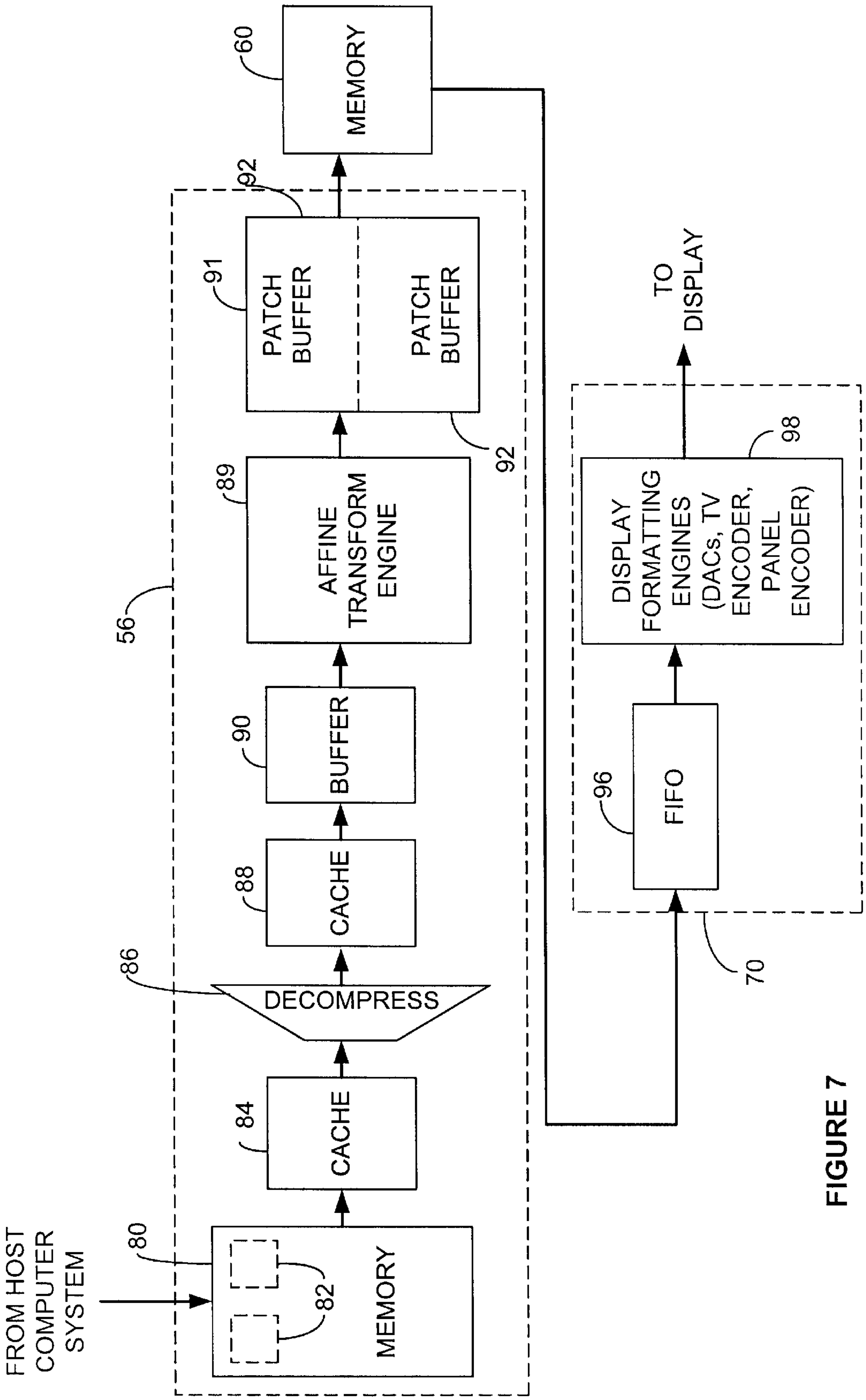
FIG. 7 is a block diagram of a graphics system according to one embodiment of the invention.

As shown in FIG. 7, the patch generator 56 has a memory 80 which stores the physical properties (e.g., size and appearance) of objects of the image in data structures 82 (e.g., "sprites") in the memory 80. When an affine transformation engine 89 requests data from the memory 80, a data decompression circuit 86 decompresses the requested data. A buffer 90 which is coupled between the affine transformation engine 89 and the memory 82 stores two Dwords (i.e., 64 bits) of data. To accelerate the rate at which. the engine 89 accesses the memory 80, a cache 84 is coupled between the decompression circuit 86 and the memory 80, and a cache 88 is coupled between the decompression circuit 86 and the buffer 90.

The engine 89 performs affine transformations (e.g., rotation and translation) of objects of a selected image layer of the image. The engine 89 also combines the image layers to form the resultant data patches 54. The engine 89 temporarily stores each newly generated data patch in a memory 91. To prevent delaying the processing of new data patches 54 by the engine 89, the memory 91 has two patch buffers 92 which are used in an alternating fashion by the engine 89.

To generate one frame of the image, the engine 89 follows the scan line pattern (left to right, top to bottom) used on the display. In this manner, the engine 89 begins at the top, left-hand corner of the image (horizontal band 50 number zero), builds each band 50 from left to right (i.e., stores data patches zero through thirty-one for each band 50), and builds the bands 50 from top (band zero) to bottom (band twenty-three).

The display interface 70 has a first-in-first-out (FIFO) memory 96 which is used to temporarily store the pixel color values for one or more scan lines retrieved from the memory 60. Display formatting engines 98 (e.g., a digital-to-analog converter (DAC), a television encoder, and a panel encoder) retrieve the pixel color values of the scan lines from the memory 96 and generate the signals used to form the scan lines on the display.

Figure 8:
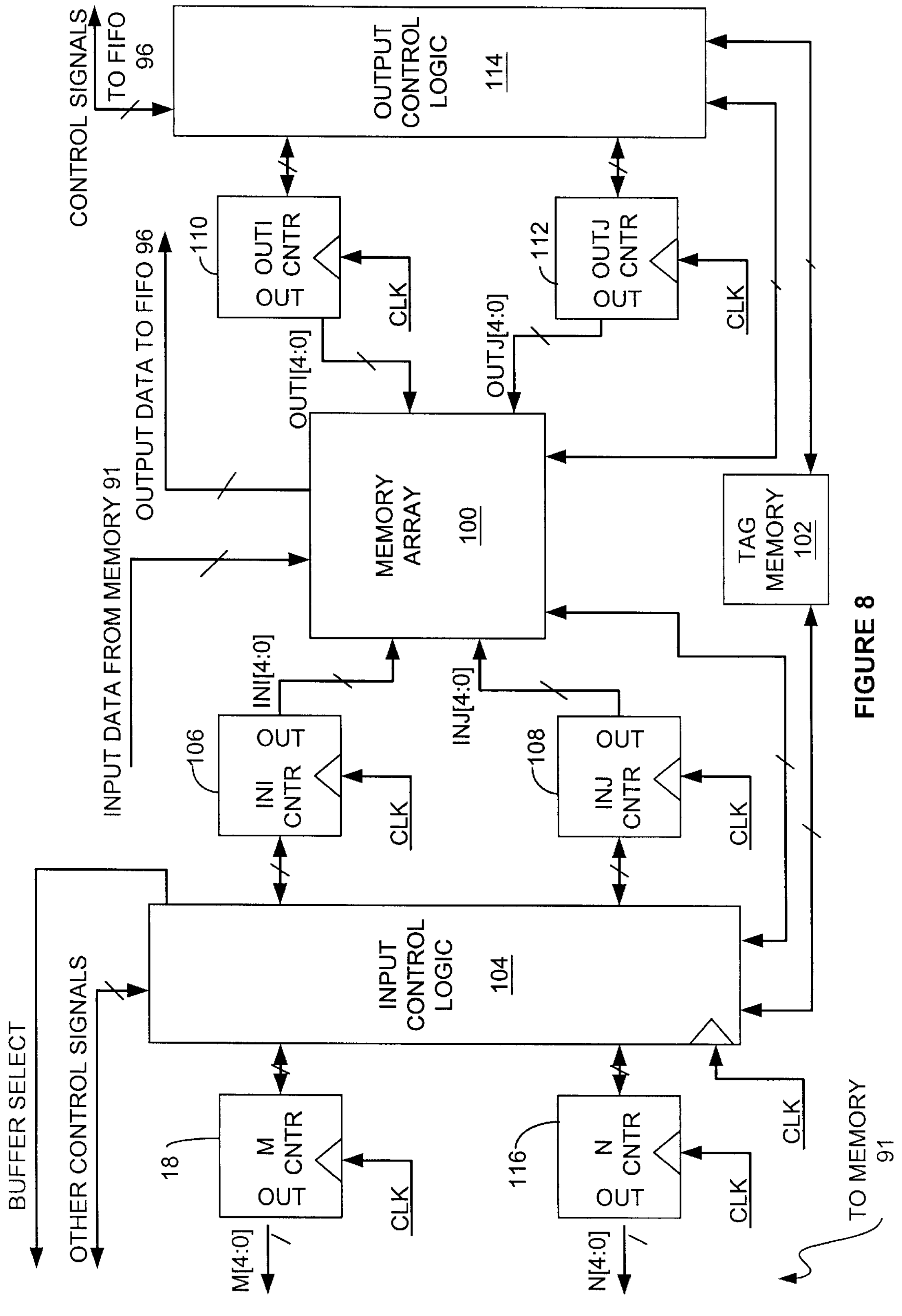
FIG. 8 is a block diagram of the patch memory of FIG. 7.

As shown in FIG. 8, the memory 60 has a bank of memory cells 100 and an input control circuit 104 that controls the data flow between the memory 91 and the memory cells 100. The memory 60 addresses the data patches 54 in the memory 91 using a band pointer N[4:0] and a data patch pointer M[4:0] (within the selected band). Because the engine 89 alternates use of the patch buffers 92 for storage of the data patches 54, the memory 60 selects one of the patch buffers 92 using a signal called BUFFER_SELECT (asserted by the input control logic 104 to select one of the buffers 92 and deasserted by the input control logic 104 to select the other buffer 92). Thus, if the data patch 54 selected by N[4:0] and M[4:0] is present in the buffer 92 selected by BUFFER_SELECT, the data patch 54 is transferred into the memory cells 100.

To generate the values for the pointers N[4:0] and M[4:0], the memory 60 has two counters 116 (for the pointer N[4:0]) and 118 (for the pointer M[4:0]) which are controlled by the input control logic 104. If the display image is conceptually divided into rows and columns of patches, M[4:0] indicates the column and N[4:0] indicates the row that the patch (to be transferred to the memory 60) is from. When enabled by the input control logic 104, both counters 116 and 118 are clocked by a CLK signal. To retrieve the data patches 54 for one frame of the image, the input control logic 104 initially clears the pointers N[4:0] and M[4:0] and the BUFFER_SELECT signal. The input control logic 104 then selectively enables (e.g., when another data patch 54 is received) and disables (e.g., when the memory 60 is awaiting another data patch) the counting by the counters 116 and 118 to control the sequence in which the data patches 54 are received. The input control logic 104 also toggles the level of the BUFFER_SELECT signal for each data patch 54 requested. After the pointer M[4:0] (i.e., data patch 54 pointer of a selected band 50) cycles from zero to thirty-one, the column pointer M[4:0] is reset to zero, and the pointer N[4:0] is incremented by one. After the pointer N[4:0] cycles from zero to twenty-three, a 1024×768 frame has been transferred to the memory, and the pointer N[4:0] is reset to zero.

To store the data patch 54 in the memory cells 100, the input control logic 104 uses the mapping scheme discussed above. The rows and columns of the memory 60 (i.e., the rows and columns of the memory cells 100) are addressed using a pointer INI[4:0] for the columns and a pointer INJ[4:0] for the rows. To accomplish this addressing, the input control logic 104 controls two counters 106 (furnishing the pointer INI[4:0] and 108 (furnishing the pointer INJ[4:0]).

A tag memory 102 aids the input control logic 104 in keeping track of which row (or column) is available for storing data patches 54. After the input control logic 104 stores a new data patch 54 in the memory cells 100, the input control logic 104 updates the tag memory 102 to indicate that the row (or column) is valid. When valid, output control logic 114 may then retrieve the row (or column) and send the data to the memory 96. Once the data is retrieved the output control logic 114 updates the tag memory 102 to indicate that data in the row (or column) is invalid, i.e., available for storing another data patch 54.

The output control logic 114 addresses the columns (using a pointer OUTI[4:0]) and rows (using a pointer OUTJ[4:0]) of the memory cells 100 using the mapping scheme discussed above. Two counters 110 (furnishing the pointer OUTI[4:0]) and 112 (furnishing the pointer OUTJ[4:0]), under the control of the output.control logic 114, are used to sequence the addressing of the scan lines in the memory 60.

Figure 9:
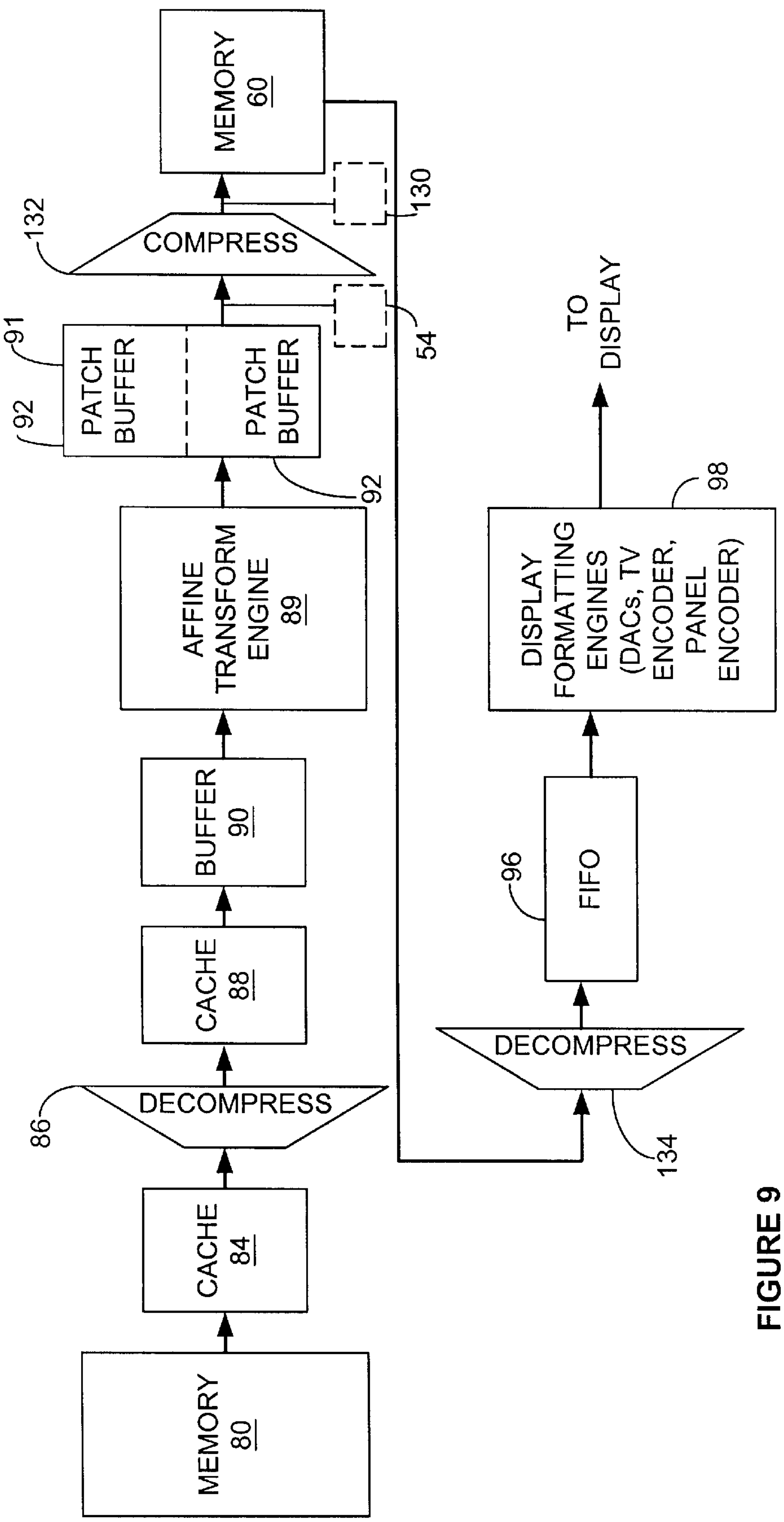
FIG. 9 is a block diagram of a graphics system according to another embodiment of the invention.

As shown in FIG. 9, in another embodiment, the data patches 54 are compressed before being stored in the memory 60. To accomplish this, a data compression circuit 132 converts each data patch 54 received from the memory 91 into a compressed data patch 130 that is stored in the memory 60. To form the compressed data patch 130, the data compression circuit 132 may use one of many different types of data compression techniques, such as Joint Photographic Expert Group (JPEG) compression or Moving Picture Expert Group (MPEG) compression.

In general, as a result of the data compression, an entire row (column) in the memory 60 is not needed to store the compressed data patch 130. To take advantage of the extra space that is sometimes available due to successful compression of a patch, a number of elements (representing this extra space) is reserved at the beginning of each row (column). This additional space in the memory 60 allows the patch generator 56 to get ahead of schedule. The freeing of additional space continues as patches are retrieved to form the scan lines.

Figure 10:
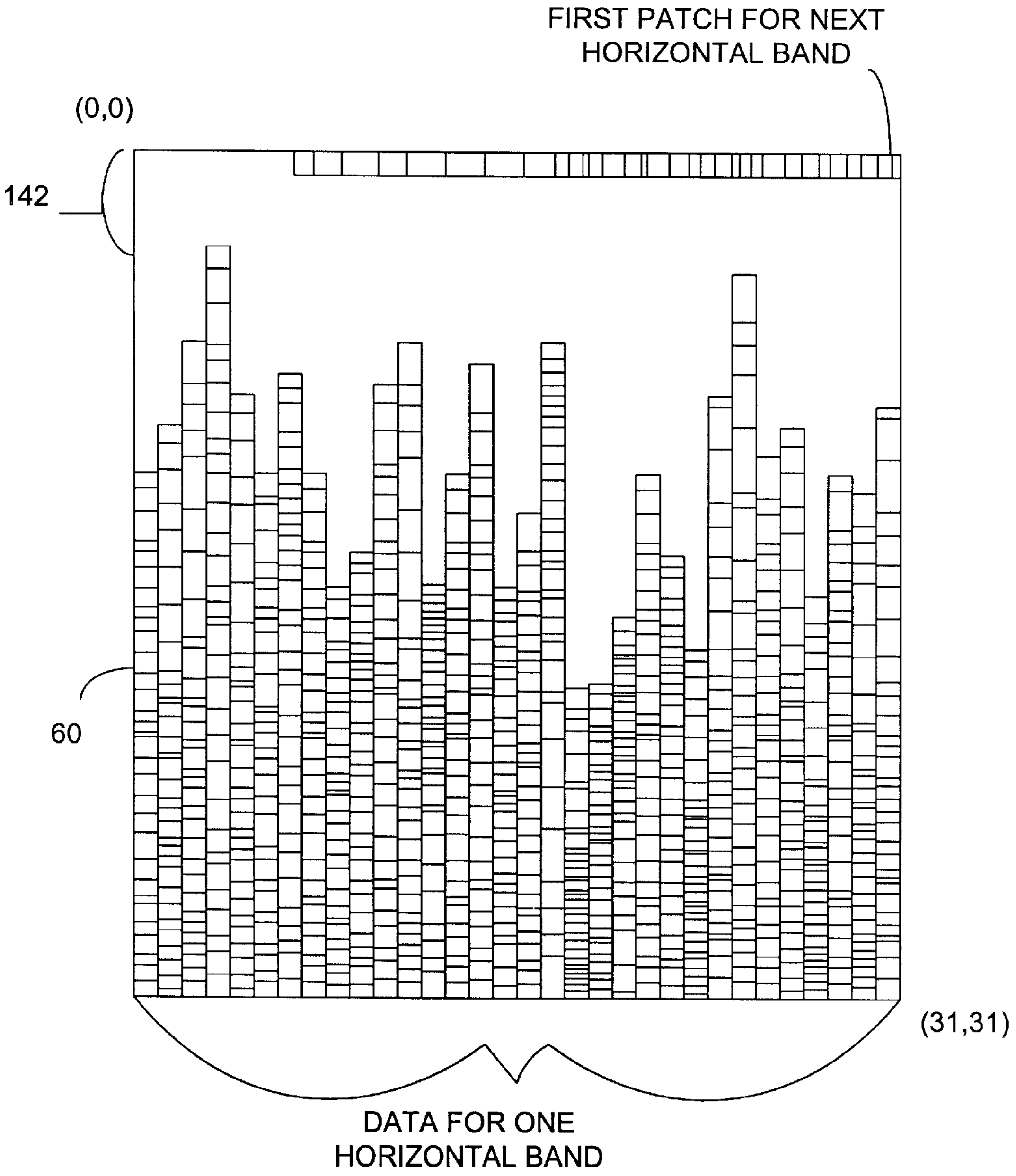
FIG. 10 is an illustration of a compression technique used in the display memory.

For example, as shown in FIG. 10, with compression, after the pixel color values for one horizontal band are stored in the columns of the memory 60, additional space 142 is available for storing (in the rows of the memory 60) the patches for the next horizontal band before the data for the first scan line is retrieved. When compression is used, a starting index of the array is equal to the difference of the width of the memory 60 (i.e., width of the column or row) less the total data needed to store the patch. This starting index is stored for each patch in the memory 60. During the data retrieval process, the start indices are updated as data is recovered so that each starting index always points to the beginning of the remaining data in the patch. When compression is good, rows (columns) of the array that are perpendicular to the patches that are currently being displayed will free up earlier than without compression. This allows the engine 89 and storage hardware to store new patches ahead of schedule. Once ahead, if a particularly difficult patch comes along, the engine 89 will have additional time to process it.

The compression circuit 132 may use a compression technique (e.g., a predictive coding scheme such as DPCM compression) that produces difference values between adjacent scan lines. As a result, adjacent scan lines from two adjacent horizontal bands 50 might be used to decode and encode the data stored in the memory 60. Thus, in this arrangement, the data for additional scan lines from horizontal bands 50 already scanned by the display interface 70 is temporarily stored for the encoding and decoding. To accomplish this, the size of the memory 60 may be increased (i.e., having a capacity large enough to hold more than one horizontal band 50), or additional memories (e.g., delay lines) might be used.

Other embodiments are within the scope of the following claims. For example, instead of processing the data patches 54 in a predefined sequence (i.e., by horizontal band 50 and by order of the patch 54 within the band 50), the engine 89 might process the most difficult data patches 54 in advance. The memory 91 might store only one data patch 54 (instead of two). By only storing one data patch 54 in the memory 91, the engine 89 waits for the data patch 54 to be transferred from the memory 91 to the memory 60 before processing another data patch 54.

What is claimed:

1. A method for use with a graphics system capable of furnishing data representative of an image having scan lines of a predetermined length for displaying the image on a single orientation display device the method comprising:

forming a data patch associated with a portion of the image, the portion of the image having a maximum scan oriented dimension less than the predetermined length, wherein forming includes forming a plurality of data patches, the plurality of data patches being substantially the same size;

storing the data patch in a region of memory;

generating a scan line for display by accessing at least a portion of the region of memory; and before the entire data patch is accessed from the region of memory, storing at least a portion of another data patch in the at least a portion of the region of memory to overwrite at least a portion of the data patch.

2. The method of claim 1, wherein the step of forming includes forming a plurality of data patches, the plurality of data patches are substantially the same size.

3. The method of claim 1, wherein the data patch comprises multiple subsets of data and each of the multiple subsets of data is associated with one of the scan lines.

4. The method of claim 1, wherein a plurality of data patches form the scan line.

5. The method of claim 1, wherein the step of storing comprises:

compressing the data.

6. The method of claim 1 further comprising:

updating the region of memory with an additional data patch as each scan line is retrieved from memory.

7. The method of claim 1, further comprising:

orthogonally storing data patches associated with successive horizontal bands.

8. The method of claim 1, further comprising:

addressing a set of predefined locations with an array in the memory, wherein the array contains rows and columns;

storing, in the row of the array, data for one of the scan lines or data for one of the data patches; and when the row of the array stores one of the data for one of the scan lines or data for one of the data patches, storing, in the column of the array, the other one of the data for one of the scan lines or data for one of the data patches.

9. The method of claim 8 further comprising:

alternating the storage of the data for one of the scan lines and the data for one of the data patches between the rows and columns of the array.

10. The method of claim 8 further comprising:

storing the data patches for even horizontal bands in the columns of the array;

storing the data patches for odd horizontal bands in the rows of the array;

retrieving the scan lines for the even horizontal bands from the rows of the array; and retrieving the scan lines for the odd horizontal bands from the columns of the array.

11. The method of claim 1 further comprising:

using the another data patch to form a subsequent scan line on the display.

12. A graphics system for use with another system capable of furnishing data representative of an image having scan lines of a predetermined length for displaying the image on a single orientation display device, the graphics system comprises:

a region of memory having X rows by Y columns, including a first row second row, first column, and a second column;

a patch generator coupled to the region of memory to store a first data patch in the first row and a second data patch in the second row during a first mode of operation, and the first data patch in the first column and the second data patch in the second column during a second mode of operation; and a display interface coupled to the region of memory to generate a scan line by accessing the first column of memory when in the first mode of operation, and by accessing the first row of memory when in the second mode of operation.

13. The graphics system of claim 12, wherein the data patch includes a plurality of data patches having substantially the same size.

14. The graphics system of claim 12, wherein each data patch comprises multiple subsets of data and each of the multiple subsets of data is associated with one of the scan lines.

15. The graphics system of claim 12, wherein the access to the first column of memory during the first mode of operation accesses a portion of the first data patch and a portion of the second data patch.

16. The graphics system of claim 12, wherein the patch generator is coupled to store the first data patch and the second data patch as compressed data.

17. The graphics system of claim 6, wherein the patch generator updates the first column of memory with a third data patch before all of the first and second data patch data has been accessed.

18. The graphics system of claim 6, wherein the patch generator orthogonally stores scan lines associated with adjacent horizontal bands.

19. A method of displaying data on a single orientation display device, the method comprising:

displaying a first horizontal line of data associated with a first band of video by accessing a single row of data in a memory;

displaying a second horizontal line of data associated with a second band of video by accessing a single column of data in the memory.

20. The method claim 19, wherein the step of displaying a horizontal line of data associated with the second band of video is displayed at the same location as the horizontal line of data associated with the first band of video.

* * * * *